(12) United States Patent
Yang

(10) Patent No.: US 7,086,602 B2
(45) Date of Patent: Aug. 8, 2006

(54) VALVE FOR MIXING COLD AND HOT WATER

(76) Inventor: Tsai Chen Yang, P.O. Box 63-99, Taichung (TW) 406

( * ) Notice: Subject to any disclaimer, the term of this patent is extended or adjusted under 35 U.S.C. 154(b) by 386 days.

(21) Appl. No.: 10/751,805

(22) Filed: Dec. 31, 2003

(65) Prior Publication Data

US 2005/0139688 A1    Jun. 30, 2005

(51) Int. Cl.
G05D 23/13    (2006.01)

(52) U.S. Cl. ................. 236/12.2; 236/12.23; 236/93 B
(58) Field of Classification Search ............... 236/12.1, 236/12.11, 12.16, 12.2, 12.21, 12.22, 12.23, 236/93 R, 93 B; 137/607, 871, 898
See application file for complete search history.

(56) References Cited

U.S. PATENT DOCUMENTS

| 3,929,283 | A | * | 12/1975 | Delpla ..................... 236/12.2 |
| 4,760,953 | A | * | 8/1988 | Trubert ..................... 137/607 |
| 6,079,625 | A | * | 6/2000 | Lebkuchner ............... 236/12.2 |
| 6,095,176 | A | | 8/2000 | Yang ........................ 137/98 |
| 6,123,094 | A | | 9/2000 | Breda ........................ 137/98 |
| 6,123,105 | A | | 9/2000 | Yang ..................... 137/625.41 |
| 6,988,669 | B1 | * | 1/2006 | Nember ..................... 236/12.2 |

\* cited by examiner

Primary Examiner—Harry B. Tanner

(57) ABSTRACT

A valve includes a housing having an inlet opening and an inlet orifice for receiving cold and hot water, a barrel slidably received in the housing and movable to control the cold and the hot water to flow into the housing. A stem is secured to the barrel and shortenable and lengthenable by different water temperature, to control the flowing of the cold and the hot water into the housing. A conduit is secured to the housing and a spring is received in the conduit, to bias against the stem. The conduit includes a passage to allow the water to flow in and out of the conduit, and to allow the spring to be quickly shortened and lengthened by different water temperature.

10 Claims, 3 Drawing Sheets

VALVE FOR MIXING COLD AND HOT WATER

BACKGROUND OF THE INVENTION

1. Field of the Invention

The present invention relates to a valve, and more particularly to a valve for mixing cold and hot water and having an easily control or balance mechanism.

2. Description of the Prior Art

Various kinds of typical valves have been developed for mixing cold and hot waters, and comprise a control device disposed in a valve housing for controlling the mixing of the cold water and the hot water, and for preventing users from being hurt by the hot water inadvertently.

For example, U.S. Pat. No. 6,095,176 to Yang discloses one of the typical valves having a control device disposed in a valve housing for controlling the mixing of the cold water and the hot water from opposite inlet pipes.

U.S. Pat. No. 6,123,105 to Yang discloses another typical valve having a control device disposed in a valve housing for controlling the mixing of the cold water and the hot water from two inlet ports formed in the bottom of the valve housing.

The above two conventional valves comprise a valve housing for attaching to different inlet pipes, but may not be coupled or attached to inlet openings or inlet pipes provided around the valve housing.

U.S. Pat. No. 6,123,094 to Breda discloses a further typical valve having a control device disposed in a valve housing, and the control device includes one or two helical control members for controlling the mixing of the cold water and the hot water from two inlet ports formed in the bottom of the valve housing. This type of the conventional valves also may not be coupled or attached to inlet openings or inlet pipes provided around the valve housing.

The present invention has arisen to mitigate and/or obviate the afore-described disadvantages of the conventional valves for mixing cold and hot waters.

SUMMARY OF THE INVENTION

The primary objective of the present invention is to provide a valve for mixing cold and hot water and including an easily control or balance mechanism.

In accordance with one aspect of the invention, there is provided a valve comprising a housing including an inlet opening and an inlet orifice formed therein for receiving cold and hot water respectively, a barrel slidably received in the housing and movable relative to the inlet opening and the inlet orifice of the housing to control the cold and the hot water to flow into the housing, a stem secured to the barrel and movable in concert with the barrel, the stem being shortenable and lengthenable by different water temperature, to move the barrel relative to the housing, and to control the flowing of the cold and the hot water into the housing, a conduit secured to the housing and including a space formed therein, a spring received in the space of the conduit, to bias against the stem. The conduit includes a passage formed therein and communicating with the space thereof, to allow the water to flow into and out of the space of the conduit, and to allow the spring to be quickly shortened and lengthened by different water temperature.

The barrel includes a pipe provided therein, and secured to the stem to secure the barrel and the stem together. The barrel includes at least one stay secured between the barrel and the pipe to form at least one pathway between the barrel and the pipe.

The housing includes a valve seat provided therein, the barrel includes an upper portion movable toward and away from the valve seat of the housing, to control the flowing of the cold water through the inlet opening of the housing.

A casing may further be provided and attached to the housing and including a valve seat provided thereon, the barrel includes a lower portion movable toward and away from the valve seat of the casing, to control the flowing of the hot water through the inlet orifice of the housing.

A duct may further be provided and slidably engaged in the casing and including an outer peripheral flange laterally extended therefrom to engage with the casing. A second spring may further be provided and engaged between the duct and the barrel.

The duct includes a bore formed therein, and at least one spoke extended into the bore thereof, to engage with the stem and to guide the stem to move relative to the duct. A block may further be provided and slidably received in the conduit and engaged with the stem, the spring being engaged with the block to bias against the stem.

A cover may further be provided and secured to the housing, a tube slidably received in the cover, the barrel being secured to the tube, and a control shank threaded to the tube to move the tube relative to the cover when the control shank is rotated relative to the cover.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
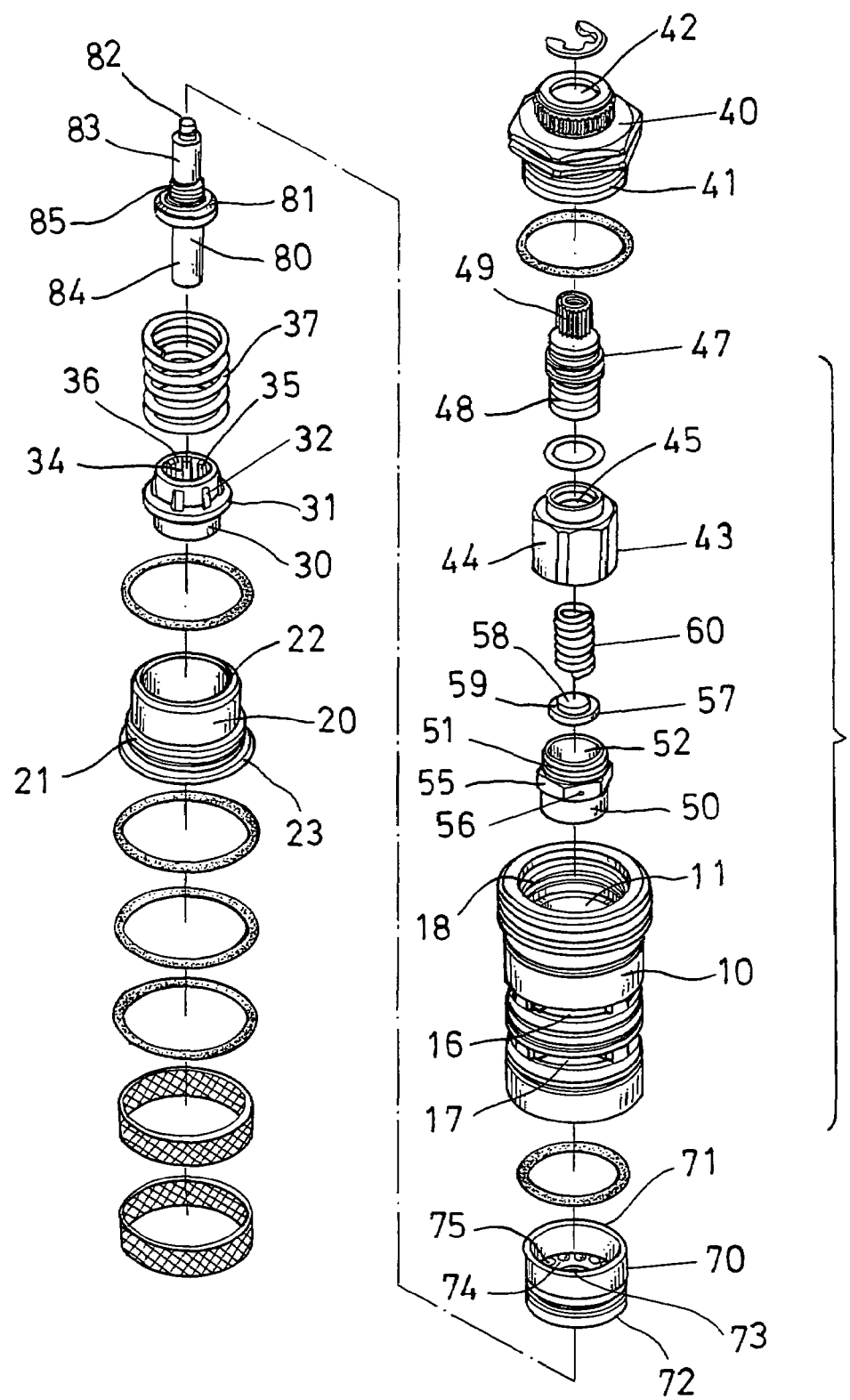
FIG. 1 is an exploded view of a valve for mixing cold and hot water in accordance with the present invention.
Figure 2:
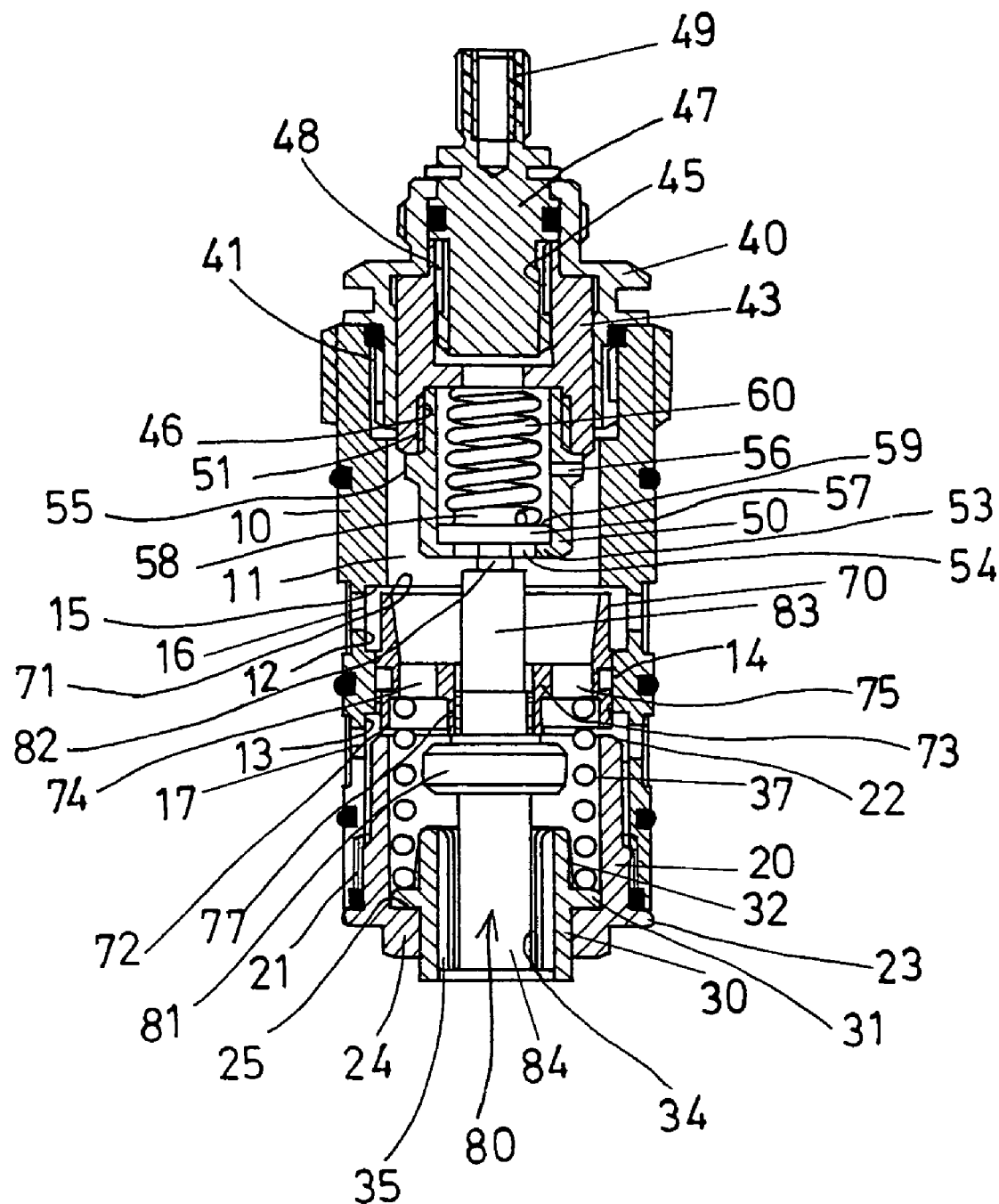
FIG. 2 is a cross sectional view of the valve for mixing cold and hot water.

Referring to the drawings, and initially to FIGS. 1 and 2, a valve in accordance with the present invention comprises a valve housing 10 including a chamber 11 formed therein, and including one or more peripheral recesses 12, 13 formed therein (FIG. 2), to define a peripheral bulge 14 in the chamber 11 thereof and located between the peripheral recesses 12, 13 thereof, and to define a valve seat 15 therein and spaced away from the peripheral bulge 14.

The housing 10 further includes one or more inlet openings 16 formed therein for receiving such as cold water, and one or more inlet orifices 17 formed therein for receiving such as hot water, and communicating with the chamber 11 thereof. It is preferable that the inlet openings 16 thereof are arranged or located above the inlet orifices 17 thereof. The housing 10 preferably includes an inner thread 18 formed in the upper portion thereof.

A casing 20 includes an outer thread 21 formed thereon for threading to the lower portion of the housing 10, and for adjustably securing to the housing 10; and includes another valve seat 22 formed or provided thereon and located beside or close to the inlet orifices 17 of the housing 10; and includes an outer peripheral flange 23 provided thereon and laterally extended outwardly therefrom to engage with the housing 10, and to limit the movement between the casing 20 and the housing 10.

As also shown in FIG. 2, the casing 20 includes an inner peripheral swelling 24 provided thereon and laterally extended inwardly therefrom to form or define a peripheral shoulder 25 therein. A duct 30 is slidably engaged in the casing 20, and includes an outer peripheral flange 31 laterally and outwardly extended therefrom to engage with or to be seated on the peripheral shoulder 25 of the casing 20, to limit the movement between the casing 20 and the duct 30.

The duct 30 includes one or more inclined reinforcing ribs 32 provided thereon and engaged between the outer peripheral flange 31 and the duct 30, for reinforcing the outer peripheral flange 31 and the duct 30. The duct 30 includes a bore 34 formed therein, and one or more spokes 35 extended into the bore 34 thereof, to form one or more water passages 36 therein and defined between the spokes 35.

A spring 37 may be engaged onto the outer peripheral flange 31 of the duct 30, for biasing the outer peripheral flange 31 of the duct 30 against the inner peripheral swelling 24 of the casing 20, in order to position the duct 30 relative to the casing 20. It is preferable that the inclined reinforcing ribs 32 of the duct 30 are engaged with the spring 37, to stably position the spring 37 relative to the duct 30, and to prevent the spring 37 from moving relative to the duct 30.

A cover 40 includes an outer thread 41 formed thereon for threading with the inner thread 18 of the housing 10, and for adjustably securing the cover 40 to the housing 10; and includes a bore 42 formed or provided therein.

A tube 43 is slidably received in the bore 42 of the cover 40, and includes one or more flat surfaces 44 formed thereon for slidably engaging with the corresponding flat surfaces (not shown) of the cover 40, and to guide the tube 43 to slide relative to the cover 40 only, and to prevent the tube 43 from being rotated relative to the cover 40 and the housing 10. The tube 43 includes an inner thread 45 formed in the upper portion thereof, and an outer thread 46 formed in the lower portion thereof.

A control shank 47 is rotatably engaged in the bore 42 of the cover 40, and includes an inner thread 48 formed in the lower portion thereof for threading to the inner thread 45 of the tube 43, and thus for moving or adjusting the tube 43 up and down relative to the cover 40 and the housing 10 when the control shank 47 is rotated relative to the cover 40. A control knob (not shown) may be attached to the upper portion 49 of the control shank 47, to move or adjust the tube 43 up and down relative to the cover 40 and the housing 10.

A conduit 50 includes an outer thread 51 formed in the upper portion thereof, for threading to the inner thread 46 of the tube 43, and thus for securing the conduit 50 to the tube 43, and thus for allowing the conduit 50 to be moved in concert with the tube 43 relative to the cover 40 and the housing 10. The conduit 50 includes a space 52 formed therein, and includes an inner peripheral flange 53 provided thereon and laterally extended inwardly therefrom to form or define an aperture 54 therein which includes a reduced inner diameter than that of the space 52 thereof.

Figure 4:
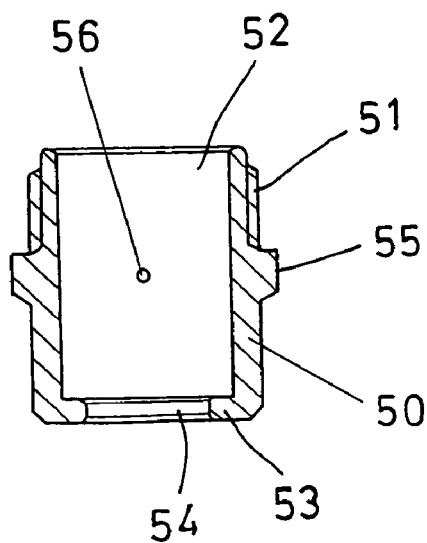
FIG. 4 is a cross sectional view of the conduit as shown in FIG. 3, taken along lines 4—4 of FIG. 3.
Figure 3:
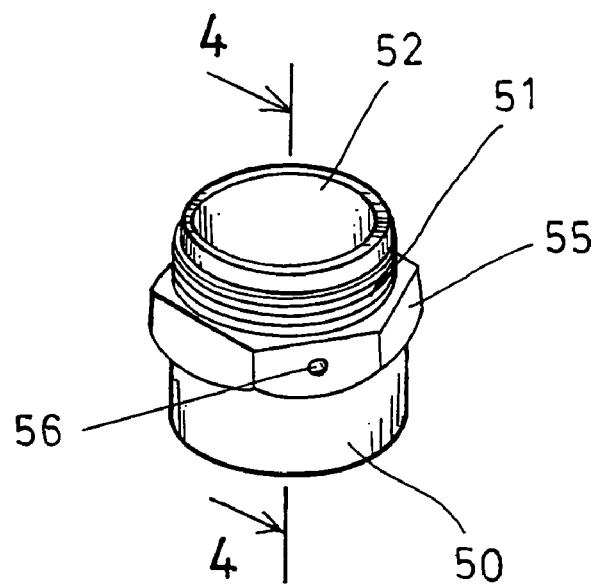
FIG. 3 is a perspective view illustrating a conduit of the valve.

The conduit 50 further includes an outer peripheral protuberance 55 extended from the middle portion thereof, for engaging with the lower portion of the tube 43, and to limit the movement between the conduit 50 and the tube 43. The conduit 50 includes a passage 56 formed therein, such as formed through the outer peripheral protuberance 55, best shown in FIGS. 3 and 4, for allowing water to flow into and out of the space 52 of the conduit 50 via the passage 56 of the conduit 50.

A block 57 is slidably received in the space 52 of the conduit 50, and engaged with the inner peripheral flange 53 of the conduit 50, and includes a protrusion 58 extended upwardly therefrom to form or define a peripheral shoulder 59 around the protrusion 58. A spring 60 is engaged onto the block 57 and includes a lower portion seated in the peripheral shoulder 59 of the block 57 and includes an upper portion engaged with the tube 43, for biasing the block 57 against the inner peripheral flange 53 of the conduit 50.

A barrel 70 is slidably received in the chamber 11 of the housing 10 and preferably slidably received in the peripheral bulge 14 of the housing 10. The barrel 70 includes an upper portion 71 for engaging with the valve seat 15 of the housing 10, to control the cold water flowing into the chamber 11 of the housing 10 via the inlet openings 16 of the housing 10, and includes a lower portion 72 for engaging with the valve seat 22 of the casing 20, to control the hot water flowing into the chamber 11 of the housing 10 via the inlet orifices 17 of the housing 10.

The barrel 70 includes a pipe 73 formed therein and secured thereto with one or more stays 74, in order to form or define one or more pathway 75 therein. The spring 37 is engaged between the barrel 70 and the duct 30, to bias or force the upper portion 71 of the barrel 70 to engage with the valve seat 15 of the housing 10, and thus to control the cold water flowing into the chamber 11 of the housing 10 via the inlet openings 16 of the housing 10.

A stem 80 is slidably engaged through the pipe 73 of the barrel 70, and includes a peripheral projection 81 extended therefrom to engage with the pipe 73 of the barrel 70, and thus to limit the movement between the stem 80 and the barrel 70. The stem 80 includes a pin 82 extended upwardly from an upper portion 83 thereof to engage with the block 57, and thus for allowing the spring 60 to bias against the stem 80.

The stem 80 includes a lower portion 84 slidably engaged in the bore 34 of the duct 30, and engaged with the spokes 35 which may guide the stem 80 to smoothly move or slide relative to the duct 30. It is preferably that the stem 80 includes an outer thread 85 formed thereon for threading with a corresponding inner thread 77 of the pipe 73, for allowing the stem 80 to be moved in concert with the barrel 70.

It is preferable that the stem 80 is made of metal materials which may be shortened or lengthened by different water temperature. For example, when much more hot water flows into the chamber 11 of the housing 10 then cold water or when no cold water flows into the housing 10, the stem 80 will be lengthened to pull or to move the barrel 70 downwardly toward the valve seat 22 of the casing 20, to reduce the flowing of the hot water into the chamber 11 of the housing 10, and thus to lower the water temperature in the housing 10, in order to prevent the users from being hurt by the hot water.

On the contrary, when much more cold water flows into the chamber 11 of the housing 10 then hot water or when no hot water flows into the housing 10, the stem 80 will be shortened to move the barrel 70 upwardly toward the valve seat 15 of the housing 10, to reduce the flowing of the cold water into the chamber 11 of the housing 10, and thus to increase the water temperature in the housing 10. The springs 37 and 60 may be adjusted or calibrated by the casing 20 and the conduit 50 to determine the flowing of the cold water and the hot water into the housing 10.

The formation or the provision of the passage 56 in the conduit 50 allows the water and/or the air to flow into and out of the conduit 50, and thus to allow the spring 60 to be easily or quickly shortened or lengthened by different water temperature. The water flowing into the housing 10 may flow out through the bore 34 or the water passages 36 of the duct 30.

Accordingly, the valve in accordance with the present invention includes an easily control or balance mechanism for controlling the flowing and the mixing of the hot water and the cold water.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A valve comprising:
    a housing including an inlet opening and an inlet orifice formed therein for receiving cold and hot water respectively,
    a barrel slidably received in said housing and movable relative to said inlet opening and said inlet orifice of said housing to control the cold and the hot water to flow into said housing,
    a stem secured to said barrel and movable in concert with said barrel, said stem being shortenable and lengthenable by different water temperature, to move said barrel relative to said housing, and to control the flowing of the cold and the hot water into said housing,
    a conduit secured to said housing and including a space formed therein,
    a spring received in said space of said conduit, to bias against said stem, and
    said conduit including a passage formed therein and communicating with said space thereof, to allow the water to flow into and out of said space of said conduit, and to allow said spring to be quickly shortened and lengthened by different water temperature.

2. The valve as claimed in claim 1, wherein said barrel includes a pipe provided therein, and secured to said stem to secure said barrel and said stem together.

3. The valve as claimed in claim 2, wherein said barrel includes at least one stay secured between said barrel and said pipe to form at least one pathway between said barrel and said pipe.

4. The valve as claimed in claim 1, wherein said housing includes a valve seat provided therein, said barrel includes an upper portion movable toward and away from said valve seat of said housing, to control the flowing of the cold water through said inlet opening of said housing.

5. The valve as claimed in claim 1 further comprising a casing attached to said housing and including a valve seat provided thereon, said barrel includes a lower portion movable toward and away from said valve seat of said casing, to control the flowing of the hot water through said inlet orifice of said housing.

6. The valve as claimed in claim 5 further comprising a duct slidably engaged in said casing and including an outer peripheral flange laterally extended therefrom to engage with said casing.

7. The valve as claimed in claim 6 further comprising a second spring engaged between said duct and said barrel.

8. The valve as claimed in claim 6, wherein said duct includes a bore formed therein, and at least one spoke extended into said bore thereof, to engage with said stem and to guide said stem to move relative to said duct.

9. The valve as claimed in claim 1 further comprising a block slidably received in said conduit and engaged with said stem, said spring being engaged with said block to bias against said stem.

10. The valve as claimed in claim 1 further comprising a cover secured to said housing, a tube slidably received in said cover, said barrel being secured to said tube, and a control shank threaded to said tube to move said tube relative to said cover when said control shank is rotated relative to said cover.

* * * * *